United States Patent Office 2,809,189
Patented Oct. 8, 1957

2,809,189

METHOD OF PRODUCING STABILIZED DIAZONIUM SALTS

Lester N. Stanley, Delmar, and Alois C. Baggenstoss, Castleton, N. Y., assignors to General Aniline & Film Corporation, New York, N. Y., a corporation of Delaware No Drawing. Application September 13, 1952, Serial No. 309,556

16 Claims. (Cl. 260—141)

This invention relates to the preparation of stable diazonium compounds and refers particularly to the production of diazonium salts or fast color salts of abnormal grain or particle size which can be used effectively as dye intermediates.

In the preparation of diazonium salts, the diazo compound, as produced by diazotization of primary amine, is generally stabilized by forming (1) a complex double salt of the diazonium chloride with an inorganic salt, such as zinc chloride, tin chloride, cadmium chloride, manganese chloride, or sodium fluoroborate, (2) aromatic or aliphatic sulfonates, (3) acid salts such as sulfates and chlorides. These are known in the trade as fast color salts (see Saunders, "The Aromatic Diazo Compounds," page 29, London, 1936), and the salts and acids combined therein with the diazonium compounds are herein referred to as "fast color salt stabilizers." In many cases the stabilized diazonium salts thus obtained have fine grain crystals which filter very poorly, due to the particle size, and result in a large proportion of water in the filter cake, which water content is detrimental to stability. The dried product creates dusting problems during grinding and in subsequent processing steps, such as measuring, pouring and packaging and use in dye house. In addition to the dusting problems arising during the processing of these diazonium salts, the fine dust particles so created are a work hazard in the form of possible skin irritations and other health hazards among the workers. Further, in precipitating many fast color salts, there is obtained either a tar-like form or an amorphous mass, both of which are practically worthless.

It has now been found that fast color salts of greatly improved crystalline form may be obtained when the fast color salt is precipitated in the presence of an aryl sulfonic acid. Attendant with the improvement in the crystalline form, there occurs a great decrease in the water content of the crystals, from as high as 30–40% by the previous techniques to 2–3% by the present invention. As a result of this lowered water content, no separate drying step is necessary. Only a thorough centrifuging or filtering followed by dry mixing and standardizing is required. Any aryl sulfonic acid can be used provided that the corresponding diazonium-aryl sulfonic acid salt of the diazo compound to be stabilized is more soluble than the diazonium-stabilizer complex which is to be isolated. It is thus apparent that the present invention is not applicable to the stabilization of a diazonium aryl sulfonate with any aryl sulfonate wherein the aryl group is the same in both instances since the solubility requirements necessary to effect the improvements of the present invention would obviously not obtain. Further, it is equally clear that not every aryl sulfonic acid will act equally well in the precipitation of every fast color salt.

Among the arylsulfonic acids which may be used are benzenedisulfonic acids, toluenesulfonic acids, xylenesulfonic acids, naphthalenedi- and trisulfonic acids, which acids correspond to the formula $$R_m\text{—Ar—}(SO_3H)_n$$

wherein Ar is a carbocyclic nucleus having from one to two rings, R is a lower alkyl of one to two carbon atoms, m has a value from 0 to 2, inclusive, and n has a value from 1 to 3, inclusive. The amount used varies from about 2–20% of the weight of the amine base employed and it can be added to the diazo solution before precipitation, to the stabilizer solution or to both the diazo solution and the stabilizer solution, but in all cases it is patent that the aryl sulfonic acids are present at the time the diazo solution and the stabilizer solution are mixed.

As the diazo compound, there may be used any of the compounds usually employed in fast color salt formation. Examples of such compounds include the diazo from aniline, chloroanilines, anisidines and phenetidines and their halogenated derivatives, toluidines and their halogenated derivatives, aminobenzanilides, aminoazo compounds and many others. The diazo may be isolated as the free inorganic salt, such as sulfate or hydrochloride, aromatic or aliphatic sulfonate, or as a complex metal salt or borofluoride as described above. Some improvement might be detected in practically all cases, but the real benefit is derived in those cases where the fast color salt is not isolable normally as well defined, good-sized crystals containing a minimum amount of water.

The invention is illustrated by the following examples, but it is to be understood that the examples are illustrative and not limitative.

Example 1

4-amino-2,5-dimethoxy-4'-nitroazobenzene is diazotized with sodium nitrite in the usual manner. The diazotization charge is treated with Nuchar (an activated carbon) and filtered. On a molal basis of amine, about .5 mol of $ZnCl_2$ and 20% of base weight of xylenesulfonic acid are dissolved in a large amount of water (about 15 mols). This is added to the diazo solution, which is then treated with salt (e. g., sodium chloride or sulfate). After allowing to stand for about two hours, the charge is filtered and sucked dry. The charge is then dry mixed and standardized as usual with sodium sulfate, aluminum sulfate and calcined magnesium sulfate. The fast color salt has the formula:

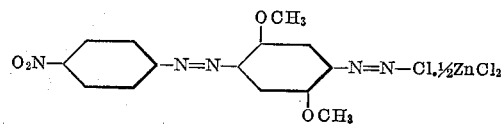

The large, reddish-brown crystals of dye obtained from this example have a coarser crystalline structure and a different crystal growth than the product obtained in a similar manner without the addition of the sulfonic acid. Because of this coarser crystalline structure, the filter cake has a higher degree of initial dryness, thus requiring addition of smaller amounts of the drying compounds used in the dry mixing step. It has practically no tendency to dust.

Example 2

4'-amino-3'-chloro-o-benzaniside is diazotized in usual manner. The diazo solution is treated with Nuchar (an activated carbon) and filtered. On the basis of 1 mol of base, 15% of base weight of naphthalene-1,3-6-trisulfonic acid is added to the filtrate. To this is then added .5 mol $ZnCl_2$ dissolved in a large amount of water (about 12 mols), followed by the addition of salt (e. g., sodium chloride or sulfate). The charge is cooled, filtered, sucked dry and dry mixed and standardized as in Example 1. The fast color salt has the formula:

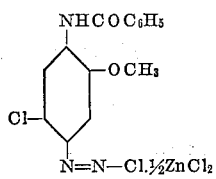

It separates out in heavy corny yellowish crystals, which have the same advantageous properties over a similar product obtained without the use of the sulfonic acid as indicated in Example 1.

*Example 3* o-Aminoazotoluene is diazotized in usual manner employing sulfuric acid as the acid. The diazo solution is Nuchared (with an activated carbon) and filtered. To the filtrate is added 10% of base weight of m-benzenedisulfonic acid per mol of base, the solution is treated with salt, cooled, centrifuged and dry mixed and standardized as above. The fast color salt has the fomula:

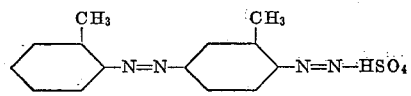

It separates out in big, reddish crystals.

We claim:

1. In a process for the preparation of a stable aromatic diazonium salt in solid form by the precipitation of said salt from an aqueous medium with an inorganic fast color salt stabilizer, the improvement which comprises effecting the precipitation of said diazonium salt in the presence of aryl sulfonic acid having the formula

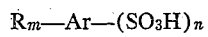

wherein Ar is a carbocyclic nucleus having from one to two rings, R is lower alkyl, $m$ has a value from 0 to 2, inclusive, and $n$ has a value from 1 to 3, inclusive.

2. In the process of claim 1, the step of adding the aryl sulfonic acid to the aqueous medium containing the diazonium salt before precipitating said diazonium salt with the said fast color salt stabilizer.

3. In the process of claim 1, the step of adding the fast color salt stabilizer and the aryl sulfonic acid simultaneously to the aqueous medium containing the diazonium salt.

4. In the process of claim 1, adding a minor amount of the aryl sulfonic acid to the aqueous medium containing the diazonium salt before precipitating said diazonium salt and also adding a minor amount of the aryl sulfonic acid simultaneously with the fast color salt stabilizer precipitant.

5. In the process of claim 1, wherein the amount of the aryl sulfonic acid employed is from 2 to 20% of the weight of amine base.

6. The method for preparing stable aromatic diazonium salts in solid form which comprises adding to an aqueous solution of an aromatic diazonium salt a minor amount of an aryl sulfonic acid having the formula

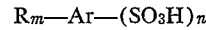

wherein Ar is a carbocyclic nucleus having from one to 2 rings, R is a lower alkyl of one to two carbon atoms, $m$ has a value from 0 to 2, inclusive, and $n$ has a value from 1 to 3, inclusive, said sulfonic acid being ineffective to precipitate any diazonium sulfonate, there being present sufficient amount of an inorganic fast color salt stabilizer to effect the formation of a diazonium salt of said fast color salt stabilizer, and isolating said stabilized diazonium salt as a solid.

7. The method of claim 6 wherein the amount of aryl sulfonic acid is from 2 to 20% of the weight of the amine base.

8. The method of claim 7 wherein the aromatic diazonium compound is the diazotization product of 4-amino-2,5-dimethoxy-4′ nitro azobenzene.

9. The method of claim 8, wherein the aryl sulfonic acid is xylenesulfonic acid.

10. The method of claim 7 wherein the diazonium compound is the diazotization product of 4′-amino-3′-chloro-o-benzaniside.

11. The method of claim 10 wherein naphthalene-1,3,6-trisulfonic acid is employed as the aryl sulfonic acid.

12. The method of claim 11 wherein zinc chloride is the inorganic fast color salt stabilizer.

13. In a process for the preparation of a stable aromatic diazonium salt in solid form by the precipitation of said salt from an aqueous medium with an inorganic salt capable of forming a complex double salt with said diazonium compound, the improvement which comprises adding to said aqueous medium a minor amount of aryl sulfonic acid having the formula

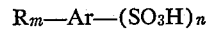

wherein Ar is a carbocyclic nucleus having from one to 2 rings, R is a lower alkyl of one to two carbon atoms, $m$ has a value from 0 to 2, inclusive, and $n$ has a value from 1 to 3, inclusive, said aryl sulfonic acid being present, in addition to the inorganic salt, during the precipitation of said stable aromatic diazonium salt.

14. In a process for the preparation of a stable aromatic diazonium salt in solid form by the isolation of said salt from an aqueous medium in the presence of an acid capable of forming acid salts with said diazonium compound, the improvement which comprises adding to said aqueous medium a minor amount of aryl sulfonic acid having the formula

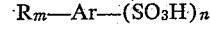

wherein Ar is a carbocyclic nucleus having from one to 2 rings, R is a lower alkyl of one to two carbon atoms, $m$ has a value from 0 to 2, inclusive, and $n$ has a value from 1 to 3, inclusive, said aryl sulfonic acid being present, in addition to the acid, during the isolation of said stable aromatic diazonium salt as a solid.

15. In the process of claim 13 wherein the inorganic salt is zinc chloride.

16. In the process of claim 14 wherein the acid is sulfuric acid.

References Cited in the file of this patent

UNITED STATES PATENTS

| | | |
|---|---|---|
| 1,629,906 | Montmollin et al. | May 24, 1927 |
| 2,101,664 | Wyler | Dec. 7, 1937 |
| 2,116,131 | Wyler | May 3, 1938 |
| 2,612,494 | Von Glahn et al. | Sept. 30, 1952 |
| 2,612,495 | Von Glahn et al. | Sept. 30, 1952 |
| 2,628,959 | Von Glahn et al. | Feb. 17, 1953 |

OTHER REFERENCES

Saunders: "The Aromatic Diazo Compounds," 1949, pp. 71 to 75, 83, 84, 85, 86, 88, 89.